US012104752B2

(12) United States Patent
Huang

(10) Patent No.: US 12,104,752 B2
(45) Date of Patent: Oct. 1, 2024

(54) LIGHT BULB USED IN LIGHT STRING

(71) Applicant: Haining deyijia Lighting Technology Co., Ltd, Jiaxing (CN)

(72) Inventor: Jianyi Huang, Jiaxing (CN)

(73) Assignee: Haining deyijia Lighting Technology Co., Ltd, Jiaxing (CN)

( * ) Notice: Subject to any disclaimer, the term of this patent is extended or adjusted under 35 U.S.C. 154(b) by 177 days.

(21) Appl. No.: 17/877,948

(22) Filed: Jul. 31, 2022

(65) Prior Publication Data

US 2023/0258303 A1 Aug. 17, 2023

(30) Foreign Application Priority Data

Feb. 11, 2022 (CN) ........................ 202220281058.8

(51) Int. Cl.

| | |
|---|---|
| ***F21K 9/232*** | (2016.01) |
| ***F21S 4/10*** | (2016.01) |
| ***F21V 19/00*** | (2006.01) |
| ***F21V 23/06*** | (2006.01) |
| ***F21W 121/00*** | (2006.01) |

(52) U.S. Cl.

CPC ................ *F21K 9/232* (2016.08); *F21S 4/10* (2016.01); *F21V 19/0005* (2013.01); *F21V 23/06* (2013.01); *F21W 2121/00* (2013.01)

(58) Field of Classification Search

None

See application file for complete search history.

(56) References Cited

U.S. PATENT DOCUMENTS

| | | | | | |
|---|---|---|---|---|---|
| 3,182,944 | A * | 5/1965 | Laviano | F21S 4/10 | 248/315 |
| 4,491,902 | A * | 1/1985 | Cangelosi | F21S 4/10 | 362/396 |
| 4,778,409 | A * | 10/1988 | Maddock | H01R 33/22 | 439/735 |
| 4,779,177 | A * | 10/1988 | Ahroni | F21S 4/10 | 313/51 |
| 5,109,324 | A * | 4/1992 | Ahroni | F21S 4/10 | 362/249.14 |
| 5,121,310 | A * | 6/1992 | Ahroni | H01R 12/675 | 362/396 |
| 6,079,848 | A * | 6/2000 | Ahroni | H01R 4/242 | 439/699.1 |
| 6,135,614 | A * | 10/2000 | Chen | H01R 33/72 | 362/654 |

(Continued)

*Primary Examiner* — Srinivas Sathiraju

(74) *Attorney, Agent, or Firm* — Bayramoglu Law Offices LLC

(57) ABSTRACT

A light bulb used in a light string comprising a lamp holder snapped onto the first wire and the second wire. A wiring base and a lamp shade are mounted on the lamp holder. A connection part is provided on the lamp shade, and the connection part is embedded between the lamp holder and the wiring base. The first wiring terminal for connecting the first wire and the second wiring terminal for connecting the second wire are embedded on the wiring base. The top of the first wiring terminal is connected to the first wire, and the top of the second wiring terminal is connected to the second wire. The bottom end of the first wiring terminal and the bottom end of the second wiring terminal are connected to each other by a filament.

6 Claims, 4 Drawing Sheets

(56) References Cited

U.S. PATENT DOCUMENTS

| | | | | |
|---|---|---|---|---|
| 8,876,321 | B2 * | 11/2014 | Chen | F21S 4/10<br>362/249.14 |
| 8,985,817 | B1 * | 3/2015 | Schalch, III | F21V 15/02<br>362/147 |
| 9,441,800 | B1 * | 9/2016 | Chen | F21V 23/06 |
| 9,441,823 | B1 * | 9/2016 | Chen | H01R 43/26 |
| 9,644,828 | B1 * | 5/2017 | May | F21S 8/04 |
| 2002/0024809 | A1 * | 2/2002 | Openiano | F21V 21/088<br>362/249.16 |
| 2005/0093454 | A1 * | 5/2005 | Fridrich | H01J 9/247<br>445/27 |
| 2007/0274072 | A1 * | 11/2007 | Prineppi | H01R 33/945<br>362/253 |
| 2008/0130284 | A1 * | 6/2008 | Altamura | F21V 19/0005<br>315/122 |
| 2013/0163231 | A1 * | 6/2013 | Chen | A47G 33/06<br>29/825 |
| 2015/0011124 | A1 * | 1/2015 | McRae | F21S 4/10<br>439/620.02 |
| 2021/0199254 | A1 * | 7/2021 | May | H02J 9/02 |
| 2023/0047982 | A1 * | 2/2023 | Wu | F21S 4/10 |
| 2023/0258303 | A1 * | 8/2023 | Huang | F21K 9/235<br>315/185 R |

* cited by examiner

LIGHT BULB USED IN LIGHT STRING

CROSS REFERENCE TO THE RELATED APPLICATIONS

This application is based upon and claims priority to Chinese Patent Application No. 202220281058.8, filed on Feb. 11, 2022, the entire contents of which are incorporated herein by reference.

TECHNICAL FIELD

The present invention belongs to the technical field of a light bulb used in a light string.

BACKGROUND

Traditional light strings have been used for many years in the arrangements of environmental lighting, such as celebration venues, holiday decorations, restaurant or hotel settings, yard decorations, outdoor parties, plant growth fill light, and others.

In the prior light string, a plurality of lamp holders are installed on the wire, but the connection between the lamp holders and the wire is too cumbersome. This not only requires to fix the lamp holders on the wire, but also requires an electrical connection between the wire and the lamp holders, leading to low production efficiency.

SUMMARY

An objective of the present invention is to provide a light bulb for a light string. The light bulb provided for the light string possesses features, such as simple structure and ease of use. The filament of the light bulb is directly connected into the circuit by directly inserting the first wiring terminal and the second wiring terminal into the first wire and the second wire and electrically connected together, which avoids tedious wiring process. The light bulb can be directly plugged or replaced, thus simplifying the connection structure, ensuring high connection efficiency, and improving electrical connecting effect.

For completing the foregoing objective of the present invention, the present invention adopts the following technical solutions.

A light bulb used in a light string includes a lamp holder snapped onto a first wire and a second wire. A wiring base and a lamp shade are mounted on the lamp holder. A connection part is provided at the top of the lamp shade. The connection part is embedded between the lamp holder and the wiring base. The first wiring terminal for connecting the first wire and the second wiring terminal for connecting the second wire are embedded on the wiring base. The top of the first wiring terminal is connected to the first wire, and the top of the second wiring terminal is connected to the second wire. The bottom end of the first wiring terminal and the bottom end of the second wiring terminal are connected to each other by a filament.

In the present invention, the first wiring terminal and the second wiring terminal are directly inserted into the first wire and the second wire, respectively, such that the filament is directly connected between the first wire and the second wire, which avoids tedious wiring process, simplifies the connection structure, ensures high connection efficiency, and improves electrical connecting effect.

Preferably, the top of the lamp holder is provided with a limiting seat for embedding the first wire and the second wire, and a fixing cover is provided on the limiting seat and configured to limit the first wire and the second wire.

Preferably, the top of the lamp holder is provided with a protruding rib in the limiting seat for separating the first wire and the second wire.

Preferably, grooves respectively corresponding to the first wiring terminal and the second wiring terminal are provided in the fixing cover. The top of the first wiring terminal passes through the first wire into the groove, and the top of the second wiring terminal passes through the second wire into the groove.

Preferably, the connection part is threadedly connected to the lamp holder.

Preferably, guide slots respectively corresponding to the first wiring terminal and the second wiring terminal are provided in the lamp holder.

Compared with the prior art, the present invention has the following advantages:

The present invention possesses features, such as simple structure and is easy to use. The filament is directly connected between the first wire and the second wire by directly inserting the first wiring terminal and the second wiring terminal into the first wire and the second wire, respectively, which avoids tedious wiring process, simplifies the connection structure, ensures high connection efficiency, and improves electrical connecting effect.

DETAILED DESCRIPTION OF THE EMBODIMENTS

In order to enable those skilled in the art to better understand the technical solution of the present invention, the preferred solution of the present invention is described below in conjunction with the embodiments.

Figure 1:
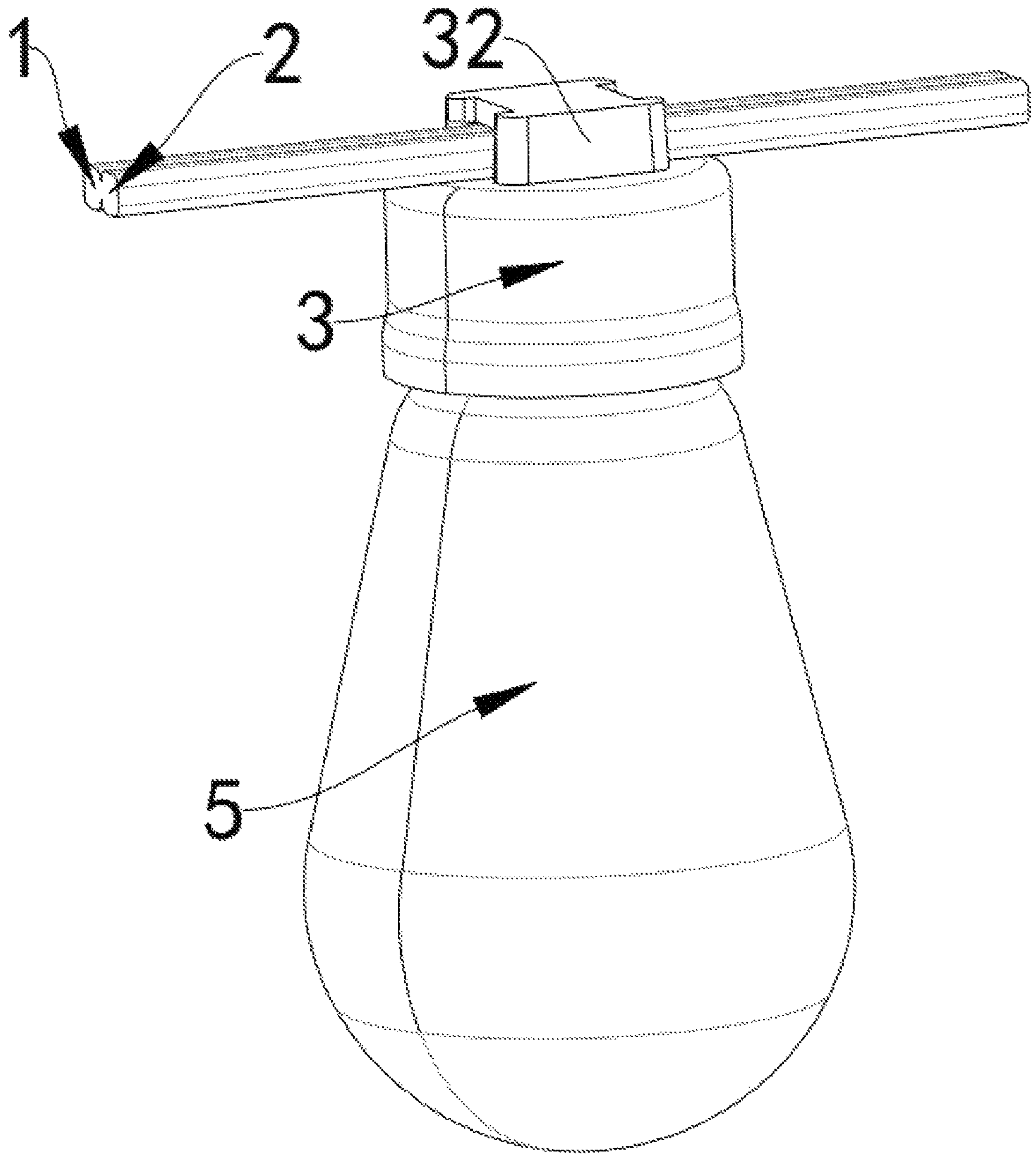
FIG. 1 is a structural diagram of the present invention.
Figure 2:
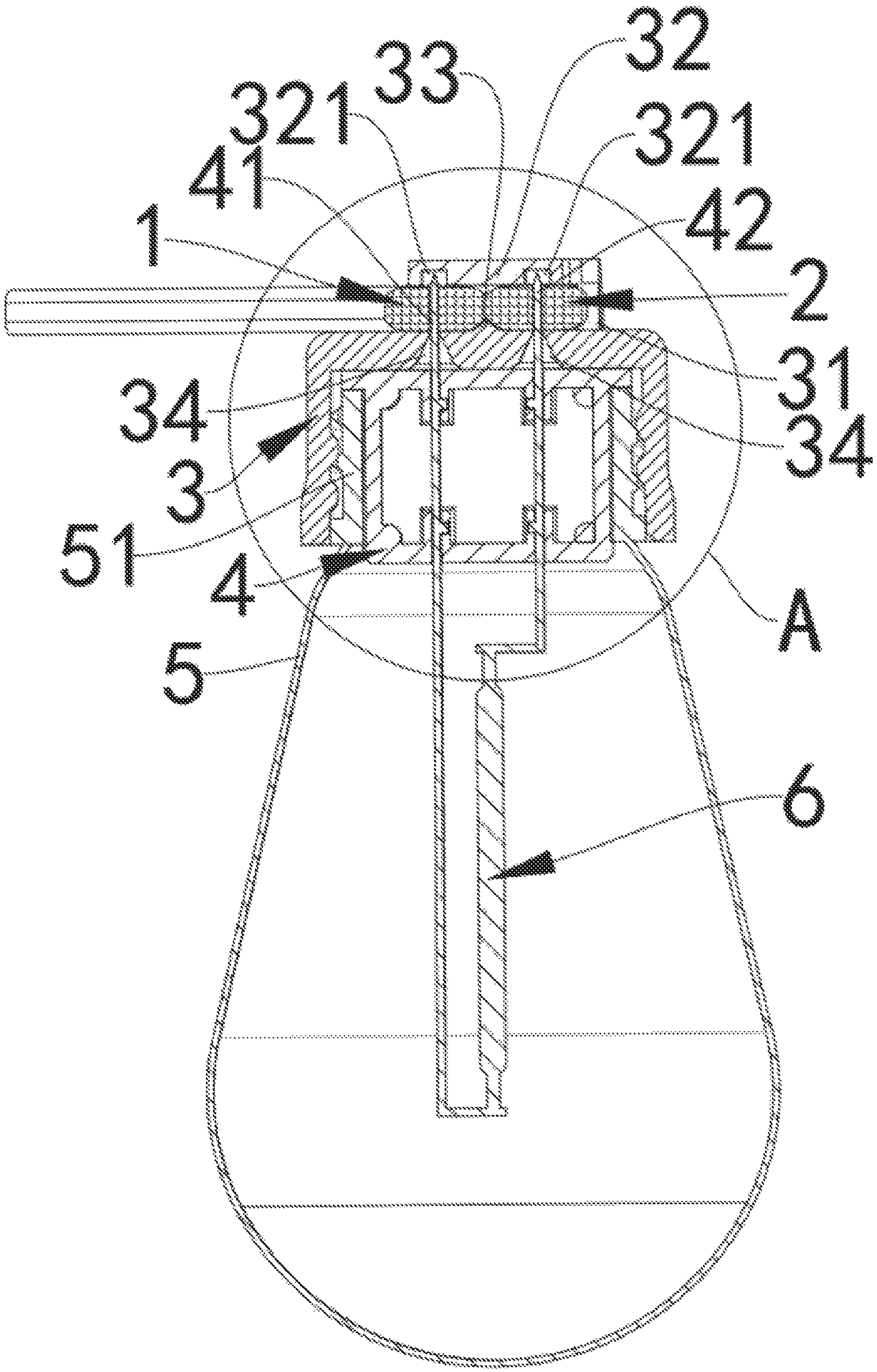
FIG. 2 is a cutaway view of the structure of the present invention.
Figure 3:
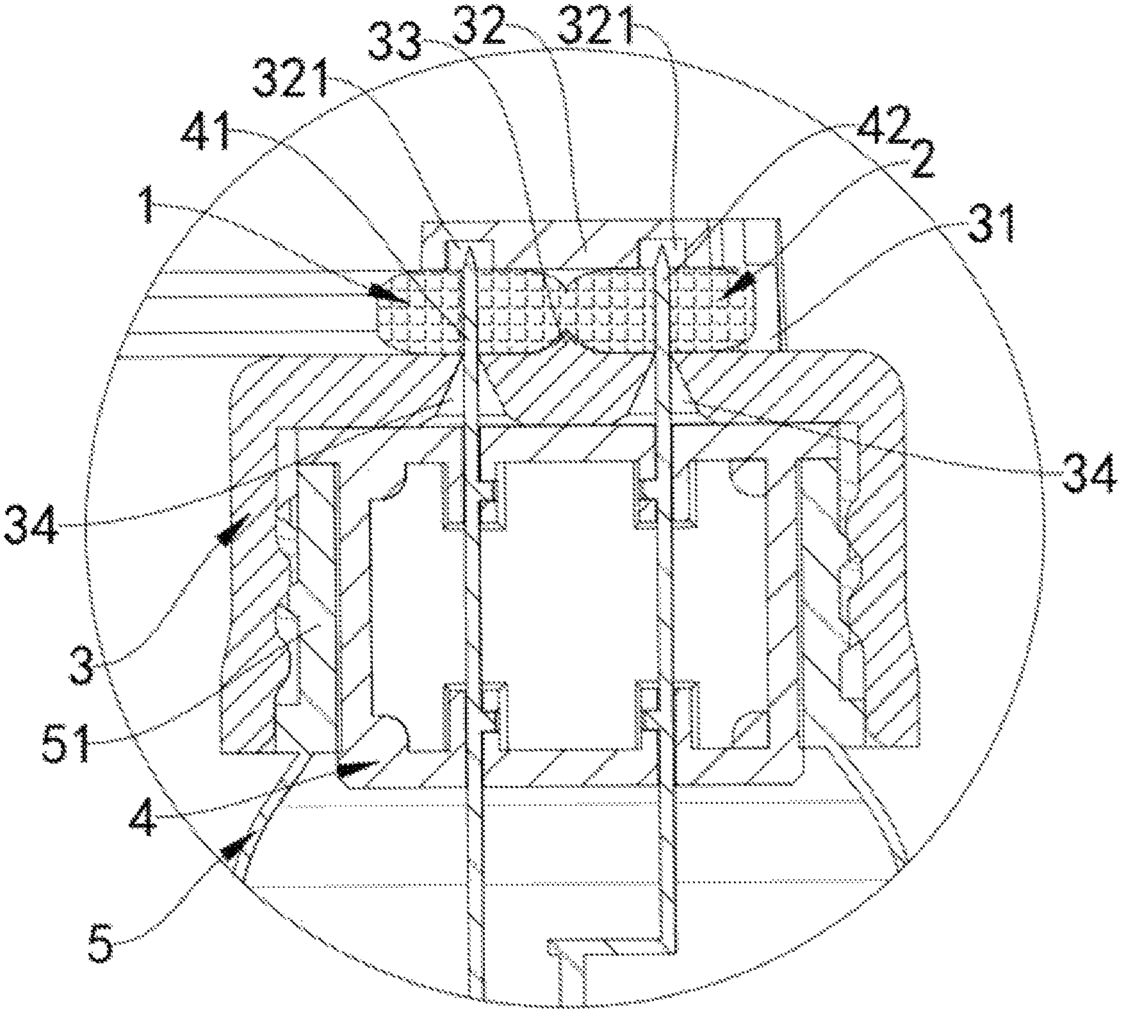
FIG. 3 is a structural diagram of the portion A circled in FIG. 2.
Figure 4:
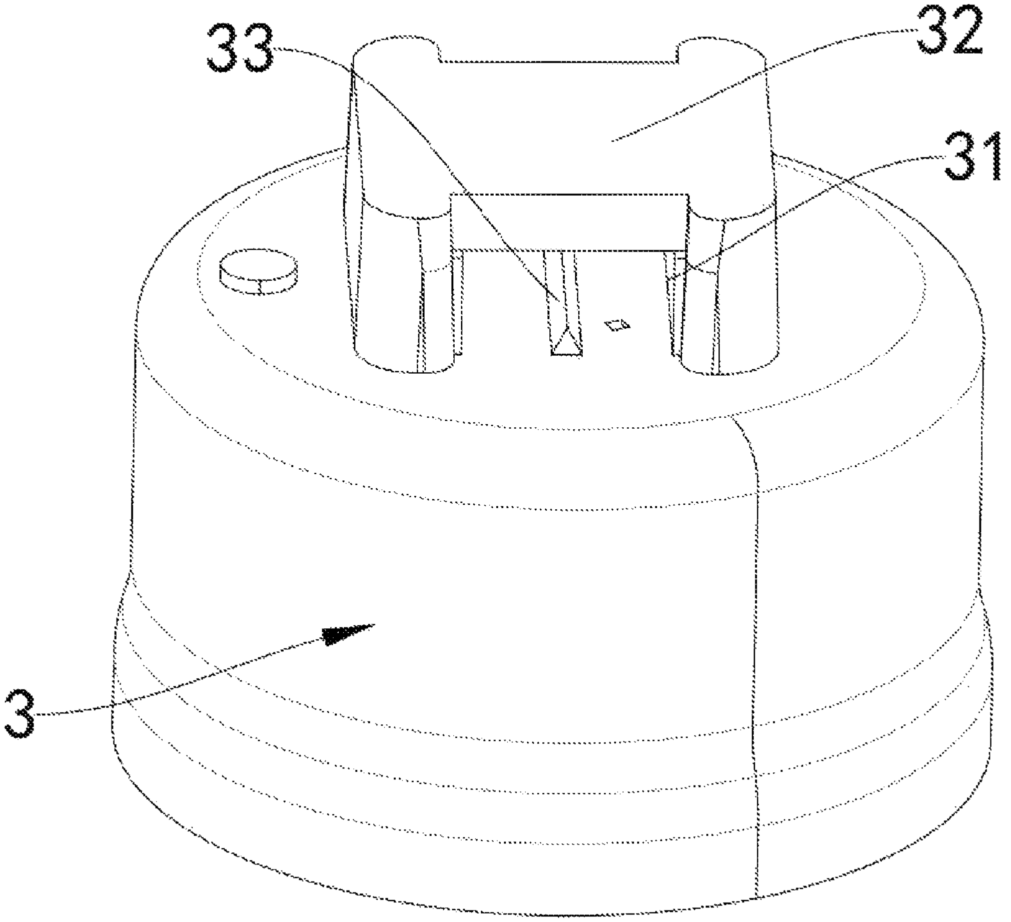
FIG. 4 is a structural diagram of the lamp holder in the present invention.

As is shown in FIGS. 1 to 4, a light bulb used in a light string includes the lamp holder 3 snapped onto the first wire 1 and the second wire 2. The first wire 1 and the second wire 2 are in a fixed position next to each other. A plurality of light bulbs used in the light string are connected in parallel with the first wire 1 and the second wire 2 to form the light string. The wiring base 4 and the lamp shade 5 are embedded in the lamp holder 3. The connection part 51 is provided at the top of the lamp shade 5, and the connection part 51 is embedded between the lamp holder 3 and the wiring base 4. The first wiring terminal 41 for connecting the first wire 1 and the second wiring terminal 42 for connecting the second wire 2 are embedded on the wiring base 4. The top of the first wiring terminal 41 is inserted into the first wire 1, and the top of the second wiring terminal 42 is inserted into the second wire 2. The bottom end of the first wiring terminal 41 and the bottom end of the second wiring terminal 42 are connected to each other by the filament 6.

In the present invention, the first wiring terminal 41 and the second wiring terminal 42 are directly inserted into the first wire 1 and the second wire 2, respectively, such that the filament 6 is directly connected between the first wire 1 and the second wire 2, which avoids the tedious wiring process, simplifies the connection structure, ensures high connection efficiency, and improves the electrical connecting effect.

Further, the top of the lamp holder 3 is provided with the limiting seat 31 for embedding the first wire 1 and the second wire 2, and the fixing cover 32 is provided on the limiting seat 31 and configured to limit the first wire 1 and the second wire 2.

By the limiting seat 31 and the fixing cover 32, the lamp holder 3 is stably connected with the first wire 1 and the second wire 2, ensuring optimal connection effect and high reliability of connection.

Further, the top of the lamp holder 3 is provided with the protruding rib 33 in the limiting seat 31 for separating the first wire 1 and the second wire 2.

Further, grooves 321 respectively corresponding to the first wiring terminal 41 and the second wiring terminal 42 are provided in the fixing cover 32. The top of the first wiring terminal 41 passes through the first wire 1 into the groove 321, and the top of the second wiring terminal 42 passes through the second wire 2 into the groove 321.

The top of the wiring terminal 41 and the top of the second wiring terminal 42 are respectively located in the grooves 321, ensuring that the first wiring terminal 41 and the second wiring terminal 42 pass through the first wire 1 and the second wire 2, respectively, to improve connecting effect. Since the top of the wiring terminal 41 and the top of the second wiring terminal 42 are respectively located in the grooves 321, direct contact with the first wiring terminal 41 or the second wiring terminal 42 is avoided in use, ensuring safety of use.

Further, the connection part 51 is threadedly connected to the lamp holder 3.

Further, the guide slots 34 respectively corresponding to the first wiring terminal 41 and the second wiring terminal 42 are provided in the lamp holder 3.

By the guide slots 34, the first wiring terminal 41 and the second wiring terminal 42 are stably guided to pass through the lamp holder 3.

INDUSTRIAL APPLICABILITY

In use, a plurality of light bulbs used for the light string are directly inserted into the first wire 1 and the second wire 2 through the first wiring terminal 41 and the second wiring terminal 42, respectively, and the bulb filament 6 is directly connected between the first wire and the second wire 2 that are connected to the power supply to complete the installation of a light string. After the power supply is turned on, all the light bulbs on the light suing are powered to emit light.

Based on the description of the present invention and the drawings, it is easy for those skilled in the art to manufacture or use the light bulbs for the light string of the present invention and to produce the positive effects documented herein.

What is claimed is:

1. A light bulb used in a light string, comprising:

a lamp holder, wherein the lamp holder is snapped onto a first wire and a second wire, and wherein the first wire and the second wire are inserted into the lamp holder from one end of the lamp holder, and the first wire and the second wire extend out from another end of the lamp holder;

a wiring base and a lamp shade mounted on the lamp holder;

a connection part provided on the lamp shade, wherein the connection part is embedded between the lamp holder and the wiring base;

a first wiring terminal embedded on the wiring base for pinning through the first wire; and a second wiring terminal embedded on the wiring base for pinning through the second wire;

wherein a first end of the first wiring terminal is a pointed end inserted into and penetrated through the first wire, and a first end of the second wiring terminal is a pointed end inserted into and penetrated through the second wire; and a second end of the first wiring terminal and a second end of the second wiring terminal are connected to each other by a filament, wherein the filament is confined in a cylinder-shaped container.

2. The light bulb used in the light string according to claim 1, wherein the lamp holder is provided with a limiting seat for embedding the first wire and the second wire, and a fixing cover is provided on the limiting seat and configured to limit the first wire and the second wire.

3. The light bulb used in the light string according to claim 2, wherein the lamp holder is further provided with a protruding rib in the limiting seat for separating the first wire and the second wire.

4. The light bulb used in the light string according to claim 2, further comprises a first groove and a second groove in the fixing cover; the first end of the first wiring terminal penetrates through the first wire into the first groove; and the first end of the second wiring terminal penetrates through the second wire into the second groove.

5. The light bulb used in the light string according to claim 1, wherein the connection part is threadedly connected to the lamp holder.

6. The light bulb used in the light string according to claim 1, wherein guide slots respectively corresponding to the first wiring terminal and the second wiring terminal are provided in the lamp holder.

* * * * *